United States Patent [19]

Nomura et al.

[11] Patent Number: 5,083,121
[45] Date of Patent: Jan. 21, 1992

[54] SYSTEM FOR MAXIMIZING UTILIZATION OF A DISPLAY MEMORY

[75] Inventors: Akihiro Nomura; Toshimi Kiyohara, both of Nara, Japan

[73] Assignee: Sharp Kabushiki Kaisha, Osaka, Japan

[21] Appl. No.: 416,416

[22] Filed: Oct. 3, 1989

[30] Foreign Application Priority Data

Oct. 7, 1988 [JP] Japan .................. 63-254562

[51] Int. Cl.$^5$ .................................. G09G 1/02
[52] U.S. Cl. .............................. 340/799; 340/703; 340/717; 340/720
[58] Field of Search ............ 340/703, 717, 716, 720, 340/799, 802, 812; 364/518, 521

[56] References Cited

U.S. PATENT DOCUMENTS

| 4,533,909 | 8/1985 | Sander ................... 340/802 X |
| 4,549,179 | 10/1985 | Welk .................... 340/720 X |
| 4,841,289 | 6/1989 | Kambayashi et al. ...... 340/720 X |
| 4,884,069 | 11/1989 | Farand .................. 340/799 |
| 4,926,166 | 5/1990 | Fujisawa et al. ......... 340/717 |

Primary Examiner—Ulysses Weldon

[57] ABSTRACT

A system for maximized utilization of a display memory of a type including $2^n$ memory elements of equal storage capacity arranged in a block fashion in corespondence with a display screen, each memory element being capable of storing, in a two-dimensional address, the pixel data which includes a predetermined number of bits. The system includes $2^{n-m}$ memory groups, each includes $2^m$ memory elements neighboring with each other on the display screen, an RAS switch connected between an RAS signal line and an RAS terminal of each of the memory elements forming each memory group, and a CAS switch connected between a CAS signal line and a CAS terminal of each of the memory elements forming each memory group. Thus, they can be switched over on a hardware basis to allow the reading of the pixel data from the display memory to be compatible with either one of a monochromatic and color display device, or one of a vertically and horizontally longer display device.

6 Claims, 4 Drawing Sheets

SYSTEM FOR MAXIMIZING UTILIZATION OF A DISPLAY MEMORY

BACKGROUND OF THE INVENTION

1. Field of the Invention

The present invention relates to a system for maximizing the utilization of a display memory used in an electric appliance for office automation such as, for example, a word-processor or a work station. It particularly relates to an electric appliance for office automation of a type utilizing a high resolution display device.

2. Description of the Prior Art

An example of an electric appliance for office automation utilizing a display memory, such an electric appliance for office automation, is shown in FIG. 5 and is currently available in the market. The illustrated electric appliance comprises a graphic central processing unit (CPU) 1, a system memory 2 for storing programs for the graphic CPU 1 and data, a character generator read-only memory (CGROM) 3 for storing character patterns of dot fonts, and a display memory 5 having parallel input/output ports, all of them being connected together by means of a local bus 9. A monochromatic cathode ray tube (CRT) 6, forming a display unit, is connected with the serial output ports of the display memory 5. The prior art system is so designed that pixel data corresponding to each picture to be displayed on the cathode ray tube 6 is, after having been once stored in the display memory 5, outputted to the cathode ray tube 6 according to a raster scanning scheme.

The display memory 5 used in the prior art electric appliance for office automation is a frame buffer compatible to the number of bits per pixel of the cathode ray tube 6 and the screen size of the cathode ray tube 6. Therefore, the display memory 5 has to be designed exclusively for use with the particular cathode ray tube 6. For example, depending on whether the cathode ray tube 6 is for color display or whether the cathode ray tube 6 is for monochromatic display, or whether the cathode ray tube 6 has a screen size longer in the vertical direction than in the horizontal direction, or whether the cathode ray tube 6 has a screen size longer in the horizontal direction than in the vertical direction, the display memory 5, for use in connection with the particular cathode ray tube 6, may take on a different construction.

Because of the foregoing reason, when an attempt is made to use the electric appliance for office automation for the presentation of both colored display and monochromatic display, an additional cathode ray tube 8 for color display, where the cathode ray tube 6 is used for monochromatic display, or for monochromatic display where the cathode ray tube 6 is used for color display, is required in combination with an additional display memory 7 dedicated to such additional cathode ray tube 8. Moreover, when one combination of cathode ray tube and dedicated display memory is in use, the other combination of cathode ray tube and dedicated display memory is not utilized in operation. Therefore the utilization of one display memory in the electric appliance for office automation cannot be effectively and efficiently maximized. This appears to constitute an obstruction to an attempt to reduce the number of display memories used. Hence, it is an obstruction to an attempt to reduce the manufacturing cost of the electric appliance as a whole.

SUMMARY OF THE INVENTION

Accordingly, the present invention has been devised with a view for providing a system of maximized utilization of a display memory, wherein the connection of the display memory can be switched over by the setting of a jumper post on a hardware basis, so that the single display memory can be utilized in combination with a variety of display units regardless of their screen size and color display capability.

In order to accomplish the above described object, the present invention, according to a first preferred embodiment thereof, provides a system of maximized utilization of a display memory of a type including $2^n$ (n being an integer) memory elements of equal storage capacity arranged in a block fashion in correspondence with a display screen. Each of the memory elements are capable of storing at least one color pixel data which includes a predetermined number of bits in a two-dimensional address. The system comprises $2^{n-m}$ (m being an integer, where n>m) memory groups, each including the $2^m$ memory elements neighboring with each other in a horizontal direction with respect to the display screen, an RAS (row address strobe) switching means connected between an RAS signal line and an RAS terminal of each of the memory elements forming each memory group, and a CAS (column address strobe) switching means connected between a CAS signal line as a CAS terminal of each of the memory elements forming each memory group.

In this system according to the first preferred embodiment of the present invention, when the display in color representation is desired, the RAS switching means is connected with all RAS terminals of the memory elements and the CAS switching means is sequentially switched over to connect with the CAS terminals of the memory elements. On the other hand, when the display in monochromatic representation is desired, the CAS switching means is connected with all CAS terminals of the memory elements and the RAS switching means is sequentially switched over to connect with the RAS terminals of the memory elements. Therefore, the single display memory can be efficiently utilized for the display selectively in color representation and in monochromatic representation.

According to the system of the first preferred embodiment of the present invention, the sequential arrangement of the $2^n$ memory elements in $2^m \times 2^{n-m}$ (width×height) corresponds to pixels on the display screen in which pixels each having a color pixel data including a predetermined number of bits are arranged in a matrix fashion. When the display in color representation is desired, the RAS switching means connects the RAS signal line with all RAS terminals of the $2^{m-n}$ memory elements of the memory groups in the horizontal direction of the matrix arrangement of the memory elements and the CAS switching means sequentially switches to connect the CAS signal line with the CAS terminals of the $2^m$ memory elements. Accordingly, in the horizontal direction from top left portion in the matrix arrangement of the memory elements, the color pixel data can be read out so as to correspond with the raster scanning of the color display screen with the consequence that a color picture can be displayed on the display screen.

On the other hand, the display screen in which pixels each having a monochromatic pixel data including one bit are arranged in a matrix arrangement, corresponds to the sequential arrangement of the 2n memory elements in 1 pixel (in width)×2n pixels (in height). When the display in monochromatic representation is desired, the CAS switching means connects the CAS signal line with all CAS terminals of the $2^m$ memory elements of the memory groups in the horizontal direction of the $2^m \times 2^{n-m}$ matrix arrangement of the memory elements and the RAS switching means sequentially switches to connect the RAS signal line with the RAS terminals of the $2^m$ memory elements. Accordingly, the monochromatic pixel data can be read out from the $2^m \times 2^{n-m}$ matrix arrangement of memory elements as if it has been read out from the $1 \times 2^n$ arrangement of the memory elements, so as to correspond with the raster scanning of the monochromatic display screen with the consequence that a monochromatic picture can be displayed on the display screen.

According to another preferred embodiment of the present invention, the system includes $2^{n-m}$ memory groups, each including of the $2^m$ memory elements neighboring with each other on the display screen, an RAS (row address strobe) switching means connected between an RAS signal line and an RAS terminal of each of the memory elements forming each memory group, and a CAS (column address strobe) switching means connected between a CAS signal line and a CAS terminal of each of the memory elements forming each memory group.

In this system according to the second preferred embodiment of the present invention, where the screen size of the display unit used in $2^{n-m}$ pixels in height and $2^n$ pixels in width, the RAS switching means is connected with all RAS terminals of the memory elements and the CAS switching means is sequentially switched over to connect with the CAS terminals of the memory elements. On the other hand, where the screen size of the display unit used is $2^n$ pixels in height and 1 pixel in width, the CAS switching means is connected with all CAS terminals of the memory elements, and the RAS switching means is sequentially switched over to connect with the RAS terminals of the memory elements. Therefore, the signal display memory can be efficiently utilized for the display selectively on the display unit of a screen size longer in the vertical direction than in the horizontal and on the display unit of a screen size longer in the horizontal direction than in the horizontal.

According to the system of the second preferred embodiment of the present invention, the screen of a size $2^{n-m}$ pixels (in height)×$2^m$ pixels (in width) corresponds to the screen for the display of the color pixel data. Further, the screen of a size $2^n$ pixels (in height)×1 pixel (in width) corresponds to the screen for the display of the monochromatic pixel data. Since, even in this system, the RAS and CAS switching means function in respective manners as hereinbefore described in connection with the system according to the first preferred embodiment of the present invention, the single display memory can be used for the display on the display screen which is longer vertically than horizontally and also for display on the display screen horizontally longer than vertically.

BRIEF DESCRIPTION OF THE DRAWINGS

This and other objects and features of the present invention will become clear from the following description taken in conjunction with preferred embodiments thereof with reference to the accompanying drawings, in which.

DETAILED DESCRIPTION OF THE EMBODIMENTS

Figure 1:
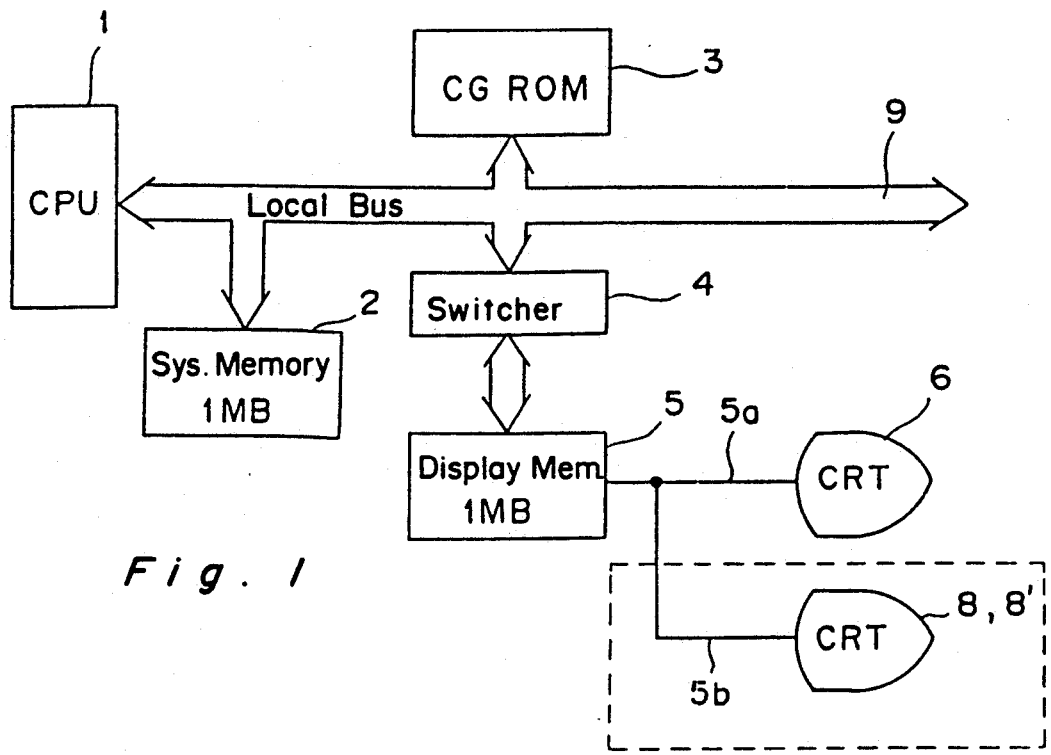
FIG. 1 is a schematic block diagram showing an example of electric appliance for office automation utilizing a system of maximized utilization of a display memory according to a first preferred embodiment of the present invention.

Before the description of the present invention proceeds, it is to be noted that like parts are designated by like reference numerals throughout the accompanying drawings.

Referring first to FIG. 1, reference numeral 1 represents a graphic central processing unit; reference numeral 2 represents a system memory for the storage of programs adapted to be executed by the central processing unit 1; reference numeral 3 represents a CG (character generator) read-only memory; and reference numeral 5 represents a display memory for the storage of pixel data corresponding to one frame in correspondence with a display screen, which memory 5 is connected with the central processing unit 1, the system memory 2 and the CG read-only memory 3 through a switching circuit 4 as will be described later, and then through a local bus 9. Reference numeral 6 represents a black-and-white cathode ray tube for the display of pixel data outputted from the display memory 5 according to a raster scanning scheme; and reference numeral 8 represents a color cathode ray tube for the display of the pixel data outputted from the display memory 5 according to the raster scanning scheme.

Figure 5:
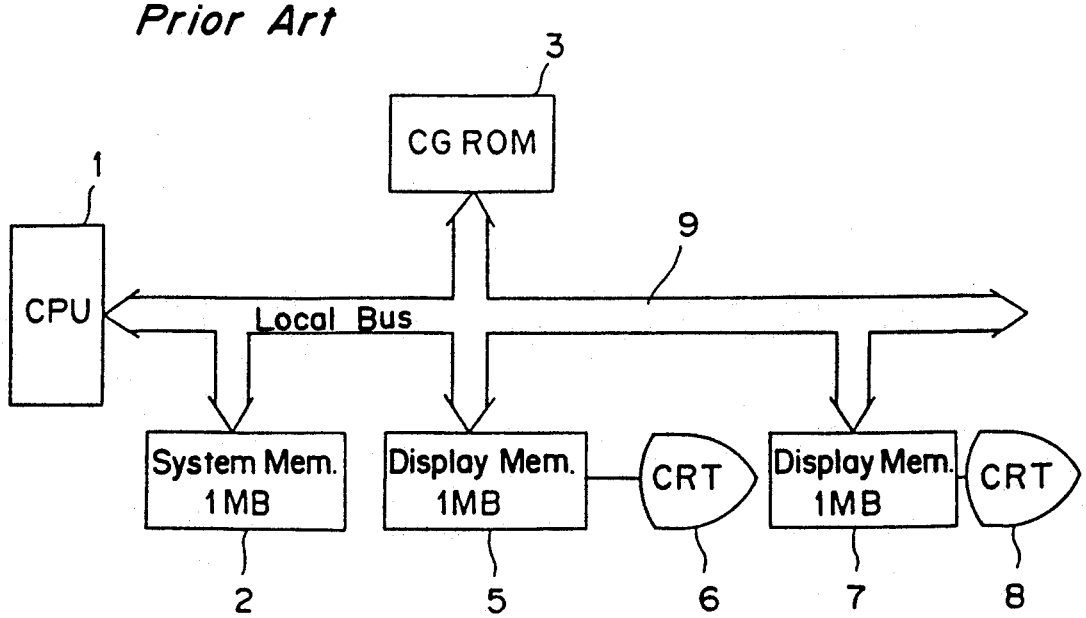
FIG. 5 is a diagram similar to FIG. 1 showing the prior art electric appliance for office automation utilizing the conventional system of utilization of the display memory.

The blocks referred to above, except for the switching circuit 4, are identical with those shown in and described with reference to FIG. 5 and, therefore, like reference numerals are employed therefor.

As shown in FIG. 1, the display memory 5 has a 1 MB (=64K×4×8 bits) storage capacity and comprises a plurality of, for example, four (=$2^{n-m}$), memory groups of memory elements 0 to 7, each memory group including two (=$2^m$) memory elements, each memory element comprising four 64K×4 bit dual port video random access memories. Each of the memory groups is connected with the central processing unit 1 and so on by means of a local bus 9 comprises of a 8-bit address bus line 9a and a 18-bit data bus line 9d. Each of the memory elements has an RAS terminal Ri and a CAS terminal Ci and is operable to store a 16-bit pixel data through the data bus line 9d at a two-dimensional address location specified by a row address, expressed by an 8-bit data on the address bus line 9a, when an RAS signal is applied to the RAS terminal Ri through a signal line $9r$, and a column address expressed by an 8-bit data on the address bus line $9a$ when a CAS signal is applied to the CAS terminal Ci through a signal line $9c$. Each of the memory elements is also operable to output the 16-bit pixel data, once stored therein, to either the black-and-white cathode ray tube 6 or the color cathode ray tube 8.

Figure 3A:
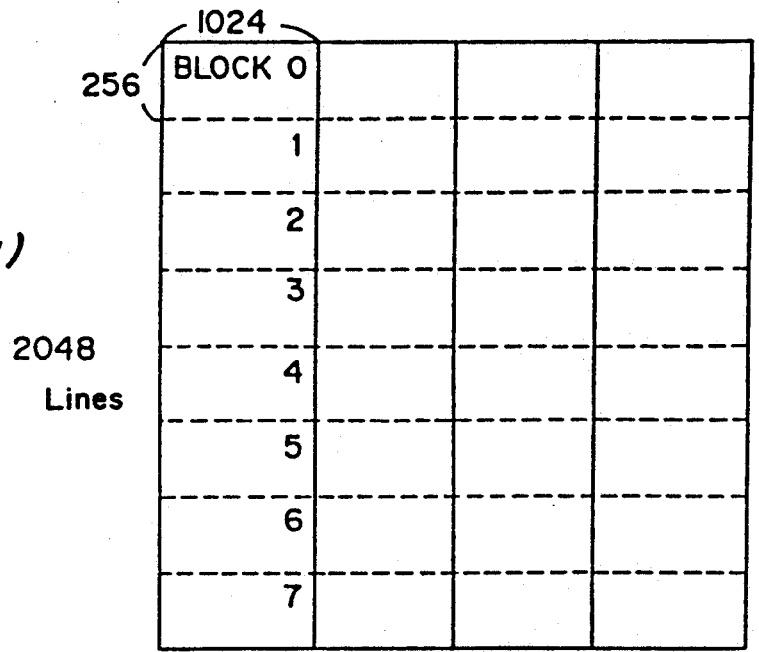
FIGS. 3(a) and 3(b) are display screens correspondence diagrams for display memories of a first embodiment.
Figure 3B:
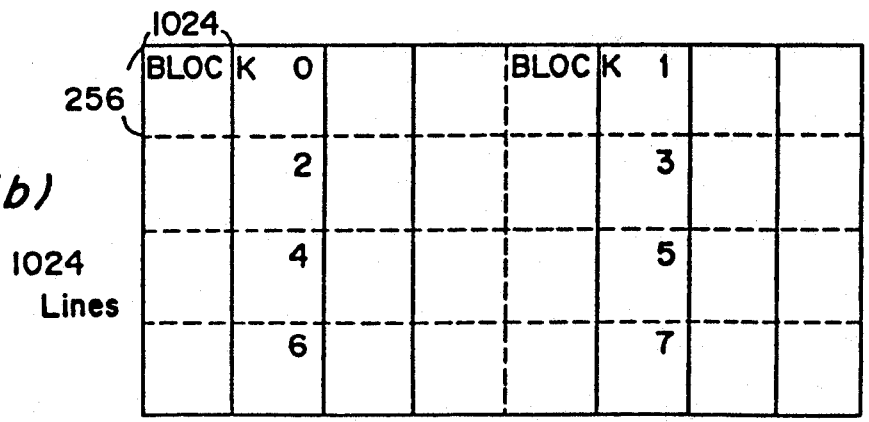

The arrangement of the eight (=2n) memory element 0 to 7 corresponds to a screen of the color cathode ray tube 8 in which 4-bit color pixels are arranged in a matrix fashion as shown in FIG. 3(b). In accordance with the present invention, in order to render the arrangement of the eight memory elements 0 to 7 as shown in FIG. 3(b) to correspond to a screen of the black-and-white cathode ray tube 6 shown in FIG. 3(a), the use has been made of the switching circuit 4, as RAS and CAS switching means which constitute major elements of the present invention.

Figure 2:
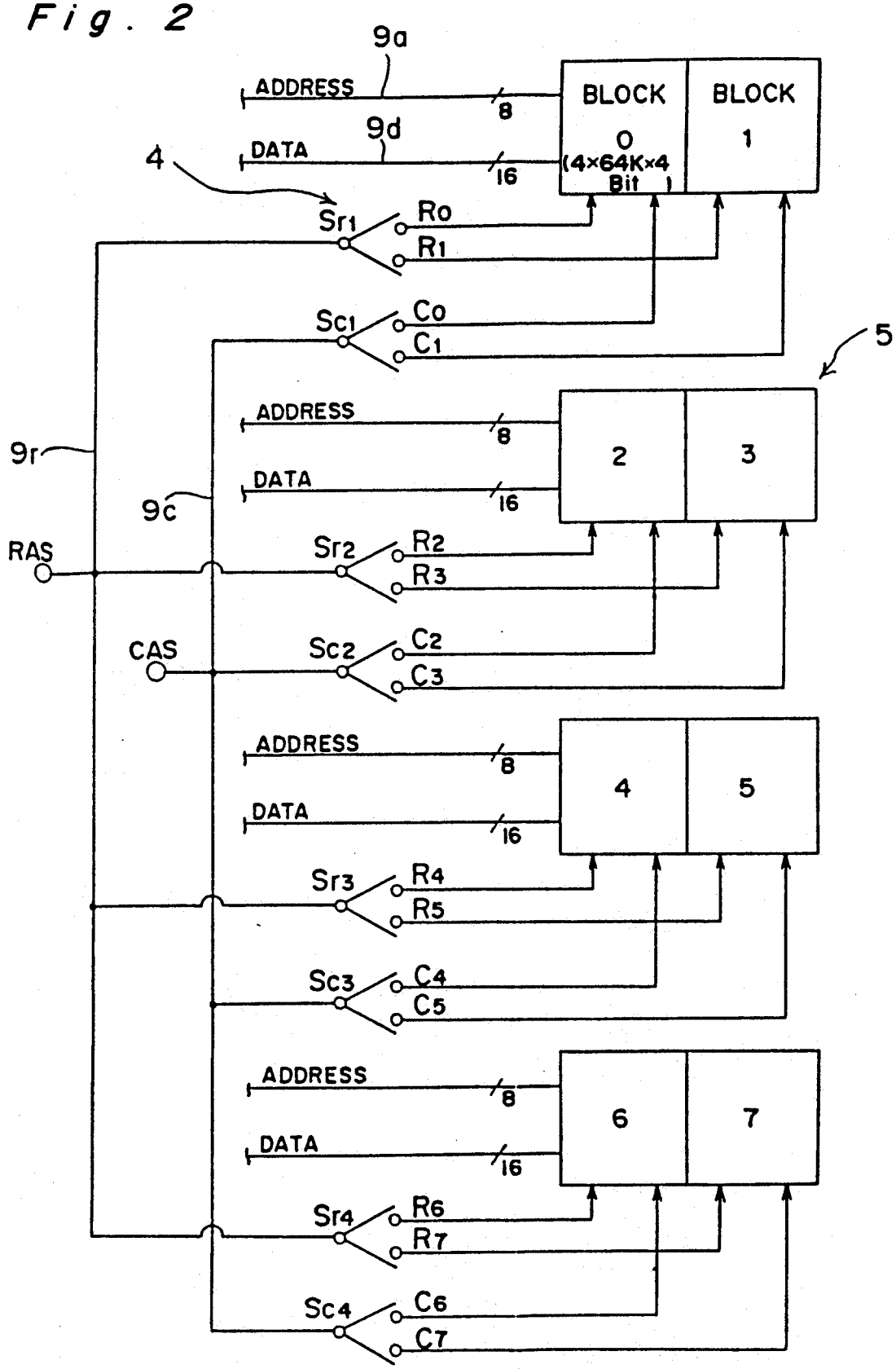
FIG. 2 is a detailed block diagram showing the display memory and a switching circuit used in the system according to the first preferred embodiment of the present invention.

The switching circuit 4 referred to above and employed in accordance with the present invention comprises, as shown in FIG. 2, RAS switches Srl (wherein l represents an integer chosen from 1 to 4, as shown in FIG. 2, for example) each connected between a signal line $9r$ and the RAS terminal Rk (wherein k represents an integer chosen from 0 to 7, as shown in FIG. 2, for example) of each of the memory elements, and CAS switches Scl (wherein l represents an integer chosen from 1 to 4, as shown in FIG. 2, for example), each connected between a signal line $9c$ and the CAS terminal Ck (wherein k represents an integer chosen from 0 to 7, as shown in FIG. 2, for example) of each of the memory elements. Where a display on the color cathode ray tube 8 is desired to be made in color, the RAS switches Srl are simultaneously connected with the RAS terminals $R_2l$ and $R_2l+1$ and, at the same time, the CAS switches Scl are selectively connected with the CAS terminal $C_2l$ and $C_{2l+1}$ in sequence for each horizontal scan. Thus, pixel data corresponding to the raster scan from a top left position of the display screen shown in FIG. 3(b) can be serially outputted from the display memory 5 to the color cathode ray tube 8.

On the other hand, where a black-and-white display is desired on the black-and-white cathode ray tube, the CAS switches Scl are simultaneously connected with the CAS terminals $C_2l$ and $C_2l+1$ and, at the same time, the RAS switches Srl are selectively connected with RAS terminals $R_2l$ and $R_2l+1$ in sequence. Thus, pixel data corresponding to the raster scan from a top left position of the display screen shown in FIG. 3(a) can be serially outputted from the display memory 5 to the black-and-white cathode ray tube 8.

Hereinafter, the operation of the switching circuit 4 in the electric appliance for office automation and the resultant display system will be described.

Since when a color display is desired on the color cathode ray tube 8, the RAS switches Srl (See FIG. 2) of the switching circuit 4 are simultaneously connected with the RAS terminals $R_2l$ and $R_2l+1$ of the memory elements of each memory group and, at the same time, the CAS switches Scl are selectively connected with the CAS terminals $C_2l$ and $C_{2l+1}$ of the memory elements of each memory group in sequence for each horizontal scan, the 4-bit color pixel data corresponding to the raster scan from the top left position of the display screen shown in FIG. 3(b) can be outputted successively onto the data bus line $9d$ from the two-dimensional address location of the display memory 5 specified by 8-bit column and row addresses inputted sequentially through the address bus line $9a$. The data are then subsequently outputted through a serial output line $5b$ (See FIG. 1.) to the color cathode ray tube 8. Accordingly, a color picture can be displayed on the display screen of the color cathode ray tube 8 (See FIG. 3(b).) in which pixels are arranged in a matrix of rows and columns, 1024 pixels in each column and 2048 pixels in each row.

On the other hand, when a black-and-white display is desired on the black-and-white cathode ray tube 6, the CAS switches Scl of the switching circuit 4 are simultaneously connected with the CAS terminals $C_2l$ and $C_2l+1$ of the memory elements of each memory group. Further, at the same time, the RAS switches Srl are selectively connected with the RAS terminals $R_2l$ and $R_2l+1$ of each memory group in sequence. Therefore, the 1-bit black-and-white pixel data corresponding to the raster scan from the top left position of the display screen shown in FIG. 3(a) can be outputted successively onto the data bus line $9d$ from the two-dimensional address location of the display memory 5 specified by 8-bit column and row addresses inputted sequentially through the address bus line $9a$. The data are then subsequently outputted through a serial output line $5a$ (See FIG. 1.) to the black-and-white cathode ray tube 6. Accordingly, a black-and-white picture can be displayed on the display screen of the black-and-white cathode ray tube 6 (See FIG. 3(a).) in which pixels are arranged in a matrix of rows and columns, 2048 pixels in each column and 4096 pixels in each row.

Thus, according to the system of maximized utilization of the display memory 5 according to the first preferred embodiment of the present invention, the connection of the memory elements forming the display memory 5 can be switched over on a hardware basis by the provision of the switching circuit 4, which is a jumper post. Therefore, the single display memory 5 can be utilized in combination with a variety of display units regardless of their screen size and color display capability. This feature makes it possible to eliminate the use of the two display memories such as was required in the prior art system shown in FIG. 5, thereby allowing the single display memory to be utilized effectively and efficiently to contribute to a reduction in manufacturing cost of the electric appliance for office automation.

Figure 4A:
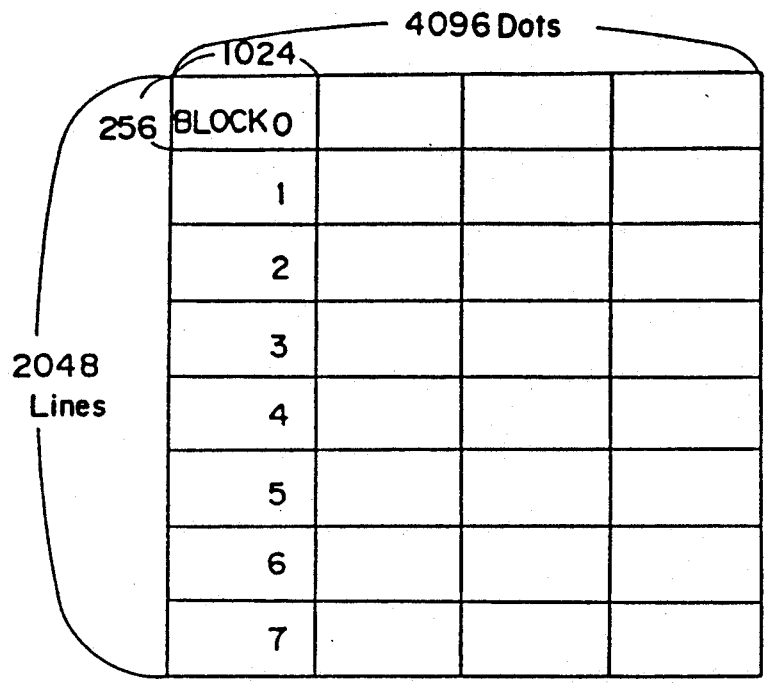
FIGS. 4(a) and 4(b) are display screens correspondence diagrams for the display memories in the system according to a second preferred embodiment of the present invention.
Figure 4B:
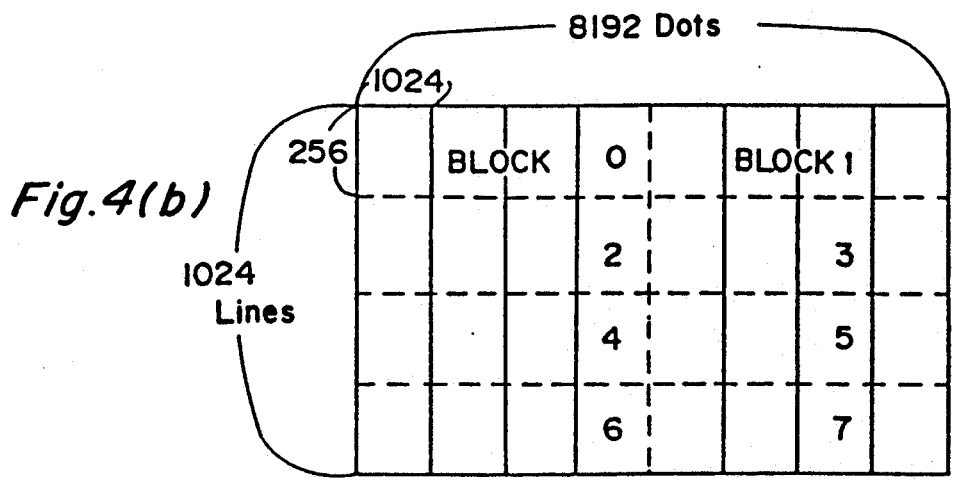

FIG. 4 is a display screen correspondence diagram for the display memory in the system according to a second preferred embodiment of the present invention, wherein FIG. 4(a) illustrates the screen of the vertically longer black-and-white cathode ray tube 6 (See FIG. 1.) having a matrix of black-and-white pixels, 2048 pixels in each column and 4096 pixels in each row, and FIG. 4(b) illustrates the screen of the horizontally longer black-and-white cathode ray tube 8' (See FIG. 1.) having a matrix of black-and-white pixels, 1024 pixels in each column and 8192 pixels in each row. An example of electric appliance for office automation to which the system of maximized utilization according to the second preferred embodiment of the present invention is substantially identical with that shown in and described with reference to FIG. 1. The only differences being that the horizontally longer black-and-white cathode ray tube 8' is replaced with the color cathode ray tube 8 shown in FIG. 1 and that the display memory 5, which has been described as adapted to store the 4-bit color pixel data in connection with the system of FIG.

1, is adapted to store 1-bit black-and-white pixel data. In addition, the switching circuit 4 used in the system according to the second preferred embodiment of the present invention is of a construction identical with that used in the system of FIG. 1 and functions in the same manner as that of the system of FIG. 1.

More specifically, in terms of the connection of the memory elements, the horizontally longer display screen, of 4 ($=2^{n-m}$) in height by 2 ($=2^m$) in width, shown in FIG. 4(b), corresponds to the color display screen of 4 in height by 2 in width shown in FIG. 3(b), and the vertically longer display screen, of 8 ($=2^n$) in height and 1 in width, shown in FIG. 4(a) corrresponds to the black-and-white display screen of 8 in height by 2 in width shown in FIG. 3(a). In addition, the RAS switches Srl and the CAS switches Scl used in the system of the second preferred embodiment of the present invention function in the same manner as hereinbefore described in connection with the system of the first preferred embodiment. Therefore, the single display memory 5 can be utilized effectively and effectively for the display on either the horizontally longer black-and-white cathode ray tube 8' or the vertically longer black-and-white cathode ray tube 8. This feature makes it possible to eliminate the use of the two display memories such as in the prior art system to thereby contribute to a maximized utilization of the display memory and also to a reduction in manufacturing cost of the electric appliance for office automation.

From the foraging full description of the present invention, it has now become clear that the system of maximized utilization of a display memory of a type comprising $2^n$ memory elements of equal storage capacity arranged in a block fashion in correspondence with the display screen, each of the memory elements being capable of storing, in a two-dimensional address, the pixel data which consists of a predetermined number of bits, comprises the $2^{n-m}$ memory groups each consisting of the $2^m$ memory elements neighboring with each other on the display screen, the RAS switching means connected between the RAS signal line and the RAS terminal of each of the memory elements forming each memory group, and the CAS switching means connected between the CAS signal line and the CAS terminal of each of the memory elements forming each memory group, so that they can be switched over on hardware basis to allow the reading of the pixel data from the display memory to be compatible with either one of the monochromatic and color display devices or one of the vertically and horizontally longer display devices. Therefore, the use of the two display memories such as required in the prior art system can be advantageously eliminated. This thereby makes it possible to accomplish a maximized utilization of the single display memory and hence makes it possible to reduce the manufacturing cost of the electric appliance for office automation.

Although the present invention has been described in connection with the preferred embodiments thereof with reference to the accompanying drawings, it is to be noted that various changes and modifications are apparent to those skilled in the art. By way of example, although in the foregoing description the cathode ray tubes 6 and 8 has been described as the vertically and horizontally longer black-and-white cathode ray tubes, respectively, they may be the horizontally and vertically longer black-and-white cathode ray tubes, respectively.

Also, although each memory group has been described as consisting of each neighboring memory elements out from the eight memory elements, it may consist of $2^m$ neighboring memory elements, out from the $2^n$ memory elements depending on the screen size and the bit number of the pixel data.

Furthermore, the present invention may not be always limited to any one of the illustrated embodiments.

Accordingly, such changes and modifications are to be understood as included within the scope of the present invention as defined by the appended claims, unless they depart therefrom.

What is claimed is:

1. A system for maximizing utilization of a display memory of a type including $2_n$ (n being an integer) memory elements of equal storage capacity arranged in a block fashion in correspondence with a display screen, each of the memory elements being capable of storing at least one color pixel data which includes a predetermined number of bits in a two-dimensional address, the system comprising:

$2^{n-m}$ (m being an integer, wherein n>m) memory groups, each including $2^m$ memory elements neighboring each other in a horizontal direction with respect to the display screen;

Row Address Strobe (RAS) switching means, connected between an RAS signal line and an RAS terminal of each of the $2^m$ memory elements forming each of the $2^{n-m}$ memory groups; and Column Address Strobe (CAS) switching means, connected between a CAS signal line and a CAS terminal of each of the $2^m$ memory elements forming each of the $2^{n-m}$ memory groups, whereby, when the display in color representation is desired, the RAS switching means is concurrently connected with all of the RAS terminals of the $2^m$ memory elements and the CAS switching means is sequentially switched over to selectively connect with each of the CAS terminals of the $2^m$ memory elements, and, when the display in monochromatic representation is desired, the CAS switching means is concurrently connected with all of the CAS terminals of the $2^m$ memory elements and the RAS switching means is sequentially switched over to selectively connect with each of the RAS terminals of the $2^m$ memory elements, to thereby permit the display memory to be efficiently utilized for the selective display in color representation and in monochromatic representation.

2. The system of claim 1, wherein, the RAS switching means is concurrently connected with all of the RAS terminals of the $2^m$ memory elements and the CAS switching means is sequentially switched over to selectively connect with each of the CAS terminals of the $2^m$ memory elements, sequentially, for each of the $2^{n-m}$ memory groups, corresponding to a video raster scan.

3. The system of claim 1, wherein, the CAS switching means is concurrently connected with all of the CAS terminals of the $2^m$ memory elements and the RAS switching means is sequentially switched over to selectively connect with each of the RAS terminals of the $2^m$ memory elements, sequentially, for each of the $2^{n-m}$ memory groups, corresponding to a video raster scan.

4. A system for maximizing utilization of a display memory of a type including $2^n$ (n being an integer) memory elements of equal storage capacity arranged in a block fashion in correspondence with a display screen, each of the memory elements being capable of storing at least one color pixel data which includes a predetermined number of bits in a two-dimensional address, the system comprising:

$2^{n-m}$ (m being an integer, where n>m) memory groups each including $2^m$ memory elements neighboring each other on the display screen;

Row Address Strobe (RAS) switching means, connected between an RAS signal line and an RAS terminal of each of the $2^m$ memory elements forming each of the $2^{n-m}$ memory groups; and Column Address Strobe (CAS) switching means, connected between a CAS signal line and a CAS terminal of each of the $2^m$ memory elements forming each of the $2^{n-m}$ memory groups, whereby, when a screen size of the display screen is $2^{n-m}$ pixels in a first dimension and $2^m$ pixels in a second dimension, the RAS switching means is concurrently connected with all of the RAS terminals of the $2^m$ memory elements and the CAS switching means is sequentially switched over to selectively connect with each of the CAS terminals of the $2^m$ memory elements and, when the screen size of the display screen is $2^n$ pixels in the first dimension and 1 pixel in the second direction, the CAS switching means is connected with all of the CAS terminals of the $2^m$ memory elements and the RAS switching means is sequentially switched over to selectively connect with each of the RAS terminals of the $2^m$ memory elements, to thereby permit the display memory to be efficiently utilized for the selective display on the display unit of a screen size longer in the first dimension than in the second, and on the display unit of a screen size longer in the second dimension than in the first.

5. The system of claim 4, wherein, the RAS switching means is concurrently connected with all of the RAS terminals of the $2^m$ memory elements and the CAS switching means is sequentially switched over to selectively connect with each of the CAS terminals of the $2^m$ memory element, sequentially, for each of the $2^{n-m}$ memory groups, corresponding to a video raster scan.

6. The system of claim 4, wherein, the CAS switching means is concurrently connected with all of the CAS terminals of the $2^m$ memory elements and the RAS switching means is sequentially switched over to selectively connect with each of the RAS terminals of the $2^m$ memory elements, sequentially, for each of the $2^{n-m}$ memory groups, corresponding to a video raster scan.

* * * * *